United States Patent

O'ffill

[11] 4,262,878
[45] Apr. 21, 1981

[54] HYDRAULIC VALVE

[75] Inventor: Joseph M. O'ffill, Shawnee Mission, Kans.

[73] Assignee: Shale Oil Science & Systems, Inc., Kansas City, Mo.

[21] Appl. No.: 59,231

[22] Filed: Jul. 20, 1979

[51] Int. Cl.$^3$ .............................................. F16K 25/00
[52] U.S. Cl. ..................................... 251/175; 251/328; 251/62
[58] Field of Search ...................... 251/61, 61.1, 61.2, 251/62, 175, 326, 328, 63

[56] References Cited

U.S. PATENT DOCUMENTS

| | | | |
|---|---|---|---|
| 715,745 | 12/1902 | Bickford | 251/175 |
| 1,873,138 | 8/1932 | Mitchell | 251/61.1 |
| 2,582,877 | 1/1952 | Mekler | 251/175 |
| 3,022,977 | 2/1962 | Jones | 251/61.1 |
| 3,145,969 | 8/1964 | VonZweck | 251/328 |
| 3,207,469 | 9/1965 | Frame | 251/175 |
| 3,576,198 | 4/1971 | Bessot | 251/175 |
| 3,905,389 | 9/1975 | Snape | 251/62 |
| 4,131,131 | 12/1978 | Frisch | 251/175 |

FOREIGN PATENT DOCUMENTS

| | | | |
|---|---|---|---|
| 1153456 | 3/1958 | France | 251/175 |
| 1256447 | 3/1960 | France | 251/175 |
| 1440572 | 6/1976 | United Kingdom | 251/175 |

*Primary Examiner*—Martin P. Schwadron
*Assistant Examiner*—G. L. Walton
*Attorney, Agent, or Firm*—Schmidt, Johnson, Hovey & Williams

[57] ABSTRACT

A compact, hydraulically operated pressure valve for selective opening and closing of conduits or the like is provided which can withstand extremely high pressures in use, is easily repaired and/or replaced, and is low in cost. The valve includes a thin, circular metallic diaphragm which is mounted for bulging in response to pressure directed thereagainst, along with cavity structure adjacent to and in communication with one face of the diaphragm; in use when the diaphragm is located in closing relationship to a pressurized conduit, hydraulic fluid directed to the chamber establishes a desired pressure differential across the diaphragm such that the latter experiences only a desired pressure. The bulging of the diaphragm also causes the latter to sealingly engage a sharp marginal sealing edge associated with the valve, to further enhance the integrity of the closure effected thereby.

4 Claims, 5 Drawing Figures

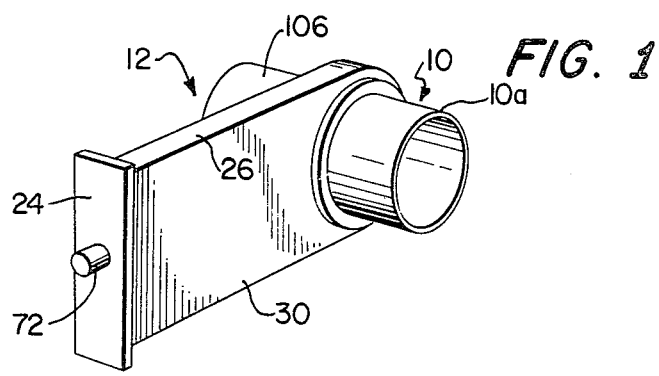
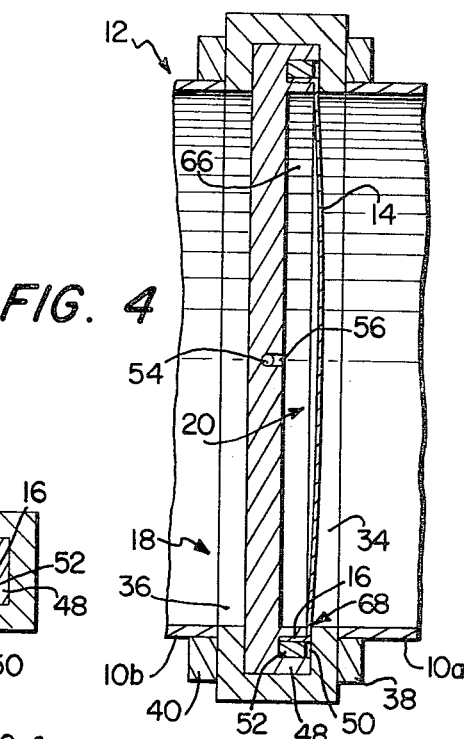
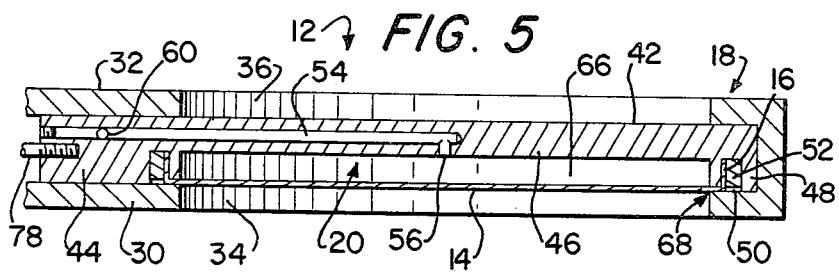
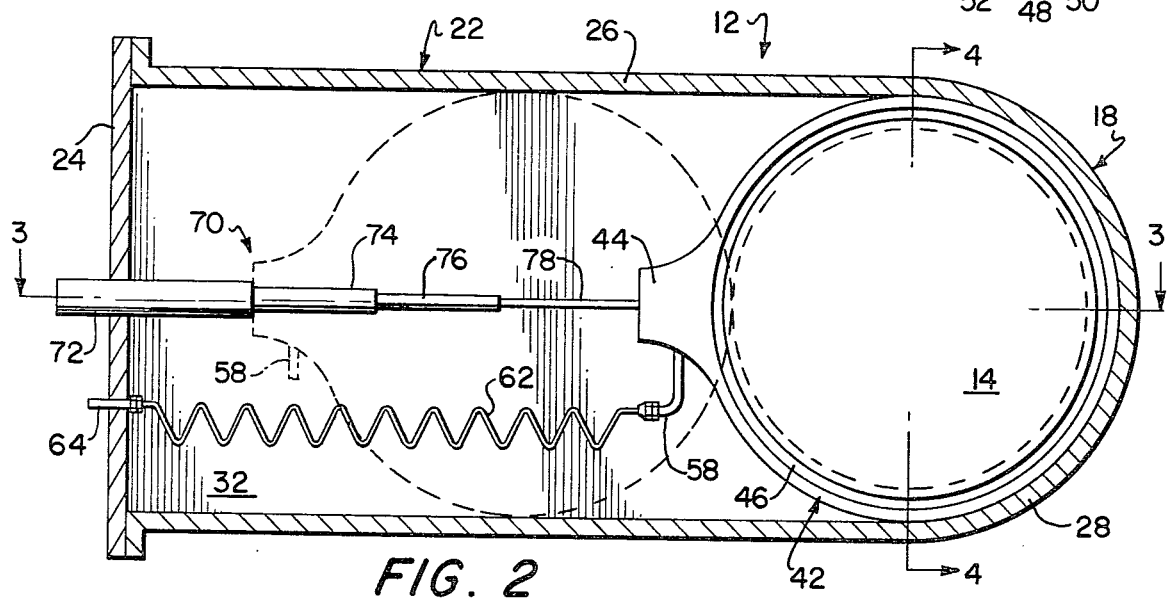
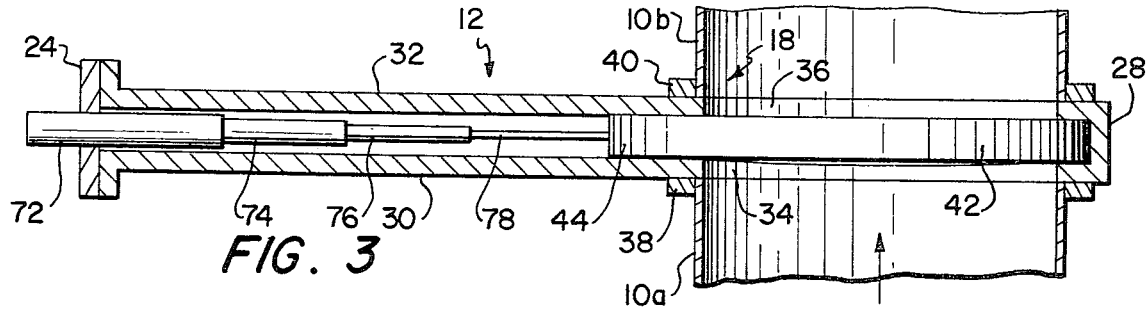

HYDRAULIC VALVE

BACKGROUND OF THE INVENTION

1. Field of the Invention

The present invention is concerned with improved valve structure especially adapted for selective closure of relatively large conduits or pipes. More particularly, it is concerned with such a valve structure which, in preferred forms, includes a hydraulic feature for enhancing the operability of the valve and permitting the same to be safely used in high pressure lines. Although the valve structure of the present invention has many possible uses, it is particularly adapted for employment in large scale commercial oil shale recovery units of the type employing the methods described in U.S. Pat. No. 4,088,562.

2. Description of the Prior Art

While a wide variety of valves are available for use in conjunction with lines of relatively small diameter, a completely different situation exists with respect to large diameter conduits and the like (on the order of twelve inches in diameter and more). In such cases valves are simply not readily available. Moreover, while such valves can be engineered and manufactured on the basis of a special order, the cost of the resultant valves is prohibitive.

The above factors are especially significant in connection with valves designed for selective opening and closing of conduits or the like carrying materials under pressure. In such cases it is difficult if not impossible to obtain valve performance guarantees, regardless of the price paid for the valves.

U.S. Pat. No. 4,088,562 describes a process for the recovery of hydrocarbons from oil shale. This process is a major breakthrough in the art, and engineering studies to date have indicated that it may be of significant help in alleviating the present energy crisis. However, in order to be commercially viable, the process must be operated using gaseous and solid material conduits of relatively large diameter (at present lines of up to forty-two inches in diameter are contemplated). Furthermore, at various points along these conduits, it is necessary to provide a valving function. Hence, the problems outlined above are particularly acute in connection with commercial-scale development of the process described in U.S. Pat. No. 4,088,562.

SUMMARY OF THE INVENTION

The present invention is directed to an improved, low cost valve assembly which is both compact and quick and easy to repair or replace. Furthermore, the valve of the invention is designed to withstand extremely high pressures, notwithstanding the use of relatively low cost materials in its manufacture.

To this end, the valve of the invention includes a membrane or diaphragm preferably formed of a flexible metallic material which presents a pair of opposed faces, along with means for selectively supporting the diaphragm with one face thereof in closing relationship to a conduit or the like. Structure is also provided for exerting pressure against the other face of the diaphragm in order to create a desired pressure differential across the diaphragm.

In preferred forms, the pressure-exerting structure includes means defining a pressure chamber in communication with the diaphragm face, and apparatus for selectively passing a pressure-inducing fluid into the chamber. The diaphragm is advantageously supported about its periphery and is constructed so as to bulge under the influence of sufficient pressure. Thus, in use the pressure-exerting structure can be set slightly above the pressure of the line being closed. In this manner the diaphragm experiences only a relatively small net pressure, and moreover is bulged outwardly against line pressure. A sharp, marginal sealing edge is positioned to be engaged by the outwardly bulged diaphragm, so as to further enhance the closure effected by the valve structure.

The diaphragm and associated structure is mounted within an enclosed track, and conventional apparatus is employed for shifting the diaphragm to a conduit-closing position, and to a retracted position, all at the will of the operator.

BRIEF DESCRIPTION OF THE DRAWING

FIG. 1 is a perspective view illustrating a short section of large diameter conduit, with a valve in accordance with the invention interposed in the section;

FIG. 2 is a vertical sectional view of the valve of the present invention, with the lateral shifting movement of the diaphragm and associated structure of the valve being depicted in phantom;

FIG. 3 is a sectional view taken along line 3—3 of FIG. 2;

FIG. 4 is a sectional view taken along line 4—4 of FIG. 2, and showing the diaphragm bulged outwardly against line pressure; and FIG. 5 is a sectional view illustrating the construction of the diaphragm and associated structure, with the diaphragm being illustrated in its unbulged, non-sealing position.

DESCRIPTION OF THE PREFERRED EMBODIMENT

Turning now to the drawing, a short section of large diameter conduit or pipe 10 is illustrated in FIG. 1, with a valve 12 in accordance with the invention interposed therein. In reality, the conduit 10 is formed of respective sections 10a and 10b, and these sections are mounted on the opposed faces of the valve 12 as will be explained.

Valve 12 includes a flexible metallic membrane or diaphragm 14 of circular configuration which has a marginal, annular mounting edge 16 as best seen in FIGS. 4 and 5. The valve 12 further includes means broadly referred to by the numeral 18 for supporting diaphragm 14 with one face thereof in communication and closing relationship with (i.e., transversely of) conduit 10, along with structure 20 for exerting pressure against the opposed diaphragm face.

Supporting means 18 includes an elongated, relatively flat, enclosed track 22 which includes a rear wall 24, a continuous sidewall 26 having a semicircular foreward end 28, and spaced, opposed end walls 30 and 32. The end walls each include a circular opening 34, 36 therethrough. These openings are coaxial and are preferably equal in diameter to the inside diameter of the conduit sections 10a and 10b (see FIG. 3). Respective annular mounting rings 38 and 40 and disposed about the corresponding openings 34, 36, for the purpose of facilitating mounting of the sections 10a, 10b adjacent the end wall openings.

The supporting means further includes a laterally shiftable, generally circular plate 42 which is disposed within the track defined by the walls 24, 26, 30 and 32.

Plate 42 includes a shank portion 44 and a circular portion 46 of lesser thickness. An annular, bifurcated, diaphragm-supporting lip 48 extends outwardly from and around the circular portion 46 and presents an annular groove 50 about the portion 46. The mounting edge 16 of diaphragm 14 extends into the groove 50 (see FIGS. 4 and 5), and is maintained in place therein by means of a locking ring 52.

A hydraulic fluid passageway 54 is provided in the plate 42 and extends from shank portion 44 thereof through circular portion 46 and terminates with a central opening 56. A rigid, L-shaped hydraulic fluid pipe 58 is secured to shank portion 44 and communicates via passageway 60 with the passageway 54. A flexible hydraulic line 62 is connected to the end of pipe 58 remote from shank section 44, and extends to a fitting 64 passing through wall 24. Conventional means (not shown) for selective passage of pressurized hydraulic fluid through fitting 64, line 62, pipe 58 and the associated plate passageways is also provided, as will be readily understood by those skilled in the art.

A pressure cavity or chamber 66 is cooperatively defined by the proximal faces of diaphragm 14 and circular portion 46, as well as the inner face of the lip 48. Moreover, it will be noted that the passageway 54 communicates directly with the chamber 66 via opening 56. It will further be observed that the innermost circular edge of the opening 34 (referred to by the numeral 68) is in closely adjacent or abutting contact with the face of diaphragm 14 remote from the chamber 66; this is important for purposes to be made clear hereinafter.

Valve 12 further includes diaphragm shifting means including a three stage piston and cylinder assembly 70. The latter includes a cylinder 72 which extends through rear wall 24, along with three extensible rod sections 74, 76 and 78. Rod section 78 is operatively coupled to the shank portion 44 of plate 42. Conventional operating controls and the like (not shown) complete this apparatus.

When it is desired to close conduit 10 (assuming that the valve is in its open position illustrated in phantom in FIG. 2), the following is done. First, piston and cylinder assembly 70 is actuated in the usual manner in order to extend the sections 74, 76 and 78. This of course serves to shift the plate 42 and the diaphragm 14 rightwardly as viewed in FIG. 2 until this structure assumes the position depicted in FIGS. 3–5. In this orientation it will be seen that the outer face of diaphragm 14 remote from chamber 66 is in communication and blocking relationship to the conduit 10.

At this point (or before if pressure conditions within the conduit 10 dictate) hydraulic fluid is delivered through fitting 64, line 52, pipe 58, passageways 60 and 54, and opening 56 to the chamber 66. The pressure developed within chamber 66 is greater than the pressure exerted against the opposed face of diaphragm 14 by the materials traveling through the conduit 10. In this situation (see FIG. 4) the diaphragm 14 is bulged outwardly against the pressure within the conduit 10 to a limited extent, so that a firm, sealing contact is established between the circular margin of the diaphragm and sealing edge 68. It will also be appreciated in this regard that pressurization achieved in this manner creates a desired pressure differential across the diaphragm which may be relatively small. That is to say, the net pressure experienced by the diaphragm 14 is less than to the pressure within conduit 10.

When it is desired to reopen conduit 10, it is only necessary to depressurize chamber 66 to equalize it with that of conduit 10, and withdraw the rod sections 74, 76 and 78 into cylinder 72. This serves to laterally shift the plate and diaphragm structure leftwardly to the position depicted in phantom in FIG. 2. At this point the conduit 10 is again fully opened.

It will thus be seen that the present invention provides a truly effective valve for use in a wide variety of contexts, particularly in conjunction with large diameter conduits or the like. Furthermore, the completely self-contained nature of the valve permits repair or replacement thereof without significant down times. Finally, the hydraulic nature of the valve permits fabrication thereof from relatively inexpensive materials, and further allows the valves to be contained in a relatively compact package.

Having thus described the invention, what is claimed as new and desired to be secured by Letters Patent is:

1. A valve for closing a conduit or the like, comprising:
    valving structure including
        a deflectable diaphragm presenting one face for communication with said conduit or the like, and an opposed, other face; and
        means for supporting said diaphragm including a rigid, essentially non-deflectable backing element in opposed relationship to said diaphragm and adjacent said other face thereof, said element and diaphragm being substantially coextensive and defining at least in part a pressure chamber therebetween;
        means for engaging and supporting said element at a region thereon remote from said diaphragm during shifting of said valving structure.
    means for shifting said valving structure between a first position wherein said diaphragm is oriented for closing of said conduit or the like upon deflection of the diaphragm, and a second position wherein said conduit or the like is open for material flow therethrough;
    means including a fluid flow passageway through said element and communicating with said chamber for passing a pressure-creating fluid into said chamber for deflecting said diaphragm in a sealing direction generally away from said backing element for closing of said conduit or the like when the diaphragm is in said first position thereof,
    said valving structure being essentially free of deflection movement under the influence of said fluid, except for said deflection of said diaphragm in said sealing direction.

2. The valve as set forth in claim 1 wherein said diaphragm is configured for bulging to a limited extent under the influence of pressure exerted thereagainst.

3. The valve as set forth in claim 2 including structure defining a sealing edge adjacent the outer margin of said one face, said edge being located for engagement by said diaphragm when the latter is bulged under the influence of pressure created by said pressure-creating structure.

4. The valve as set forth in claim 1 wherein said shifting means includes an elongated, enclosed track, and apparatus for shifting said valving structure along said track.